United States Patent

[11] 3,575,060

| [72] | Inventor | Leondras A. Warren |
| | | Whittier, Calif. |
| [21] | Appl. No. | 26,880 |
| [22] | Filed | Apr. 9, 1970 |
| | | Division of Ser. No. 755,919, Aug. 28, 1968, abandoned |
| [45] | Patented | Apr. 13, 1971 |
| [73] | Assignee | Stang Hydronics Inc. |
| | | Orange, Calif. |

[54] POWER-OPERATED AND MANUALLY-OPERATED SWIVEL JOINT
11 Claims, 4 Drawing Figs.

[52] U.S. Cl.................................................. 74/425,
239/587, 285/184, 285/276
[51] Int. Cl............................................. F16h 1/16
[50] Field of Search............................................ 74/425;
285/184, 276

[56] References Cited
UNITED STATES PATENTS

| 965,709 | 7/1910 | Hart.............................. | 285/184 |
| 1,067,516 | 7/1912 | Gleeson......................... | 285/184 |
| 2,746,773 | 5/1956 | Bily............................... | 285/276 |
| 2,986,344 | 5/1961 | Knight........................... | 285/276 |
| 2,724,978 | 11/1955 | Morrell ........................ | 74/425 |
| 3,347,570 | 10/1967 | Roessler....................... | 285/276 |

Primary Examiner—C. J. Husar
Attorney—Gausewitz & Carr

ABSTRACT: A low-friction swivel joint has incorporated therein a worm wheel, the latter being rotated by a worm driven by a fluid motor. A second and corresponding swivel joint is also provided, being driven by fluid which is passed through the first-mentioned joint in order that there will be not twisting of pipes or conduits. The passage of fluid through the first-mentioned joint is effected by transfer rings and associated grooves and passages.

POWER-OPERATED AND MANUALLY-OPERATED SWIVEL JOINT

CROSS-REFERENCE TO RELATED APPLICATION

This is a division of my copending Pat. application Ser. No. 755,919 filed Aug. 28, 1968, and now abandoned for Hydraulic Monitor Incorporating Power-Operated and Manually Operated Swivel Joint Means.

BACKGROUND OF THE INVENTION

1. Field of the Invention

This invention relates to the field of power-operated swivel joints.

2. Description of the Prior Art

Swivel joints, normally incorporating ball bearings, have previously been employed in the field of hydraulic monitors, and in numerous other fields, but have not heretofore incorporated means permitting effective power operation through use of rotary fluid motors. More particularly, the prior art has not provided a highly simple, economical, rugged and effective means for rotating swivel joint components relative to each other, particularly when the swivel joints are series related and are to be driven by rotary fluid motor means. It is especially desirable that the rotation be effected by a worm gear assembly since this provides a high mechanical advantage and, furthermore, effects locking of the joint components relative to each other during periods when no rotation is desired.

SUMMARY OF THE INVENTION

In accordance with the present invention, the internal component of a first swivel joint has formed coaxially thereon a worm wheel, the latter being meshed with a worm which is rotatably mounted on a stationary external component of the swivel joint. A second and corresponding swivel joint is provided in order to effect rotation about a different axis. Each worm is driven by a rotary fluid motor, and the flow of fluid to and from the fluid motor of the second swivel joint is effected through the first swivel joint in order to prevent twisting of the hydraulic or pneumatic conduits. Transfer ring, groove and passage means are provided in at least such first swivel joint in order to achieve such flow therethrough to and from such second swivel joint.

BRIEF DESCRIPTION OF THE DRAWINGS

FIG. 3 is a horizontal section on line 3-3 of FIG. 2; and

FIG. 4 is a horizontal section on line 4-4 of FIG. 2.

DESCRIPTION OF THE PREFERRED EMBODIMENT

Figure 1:
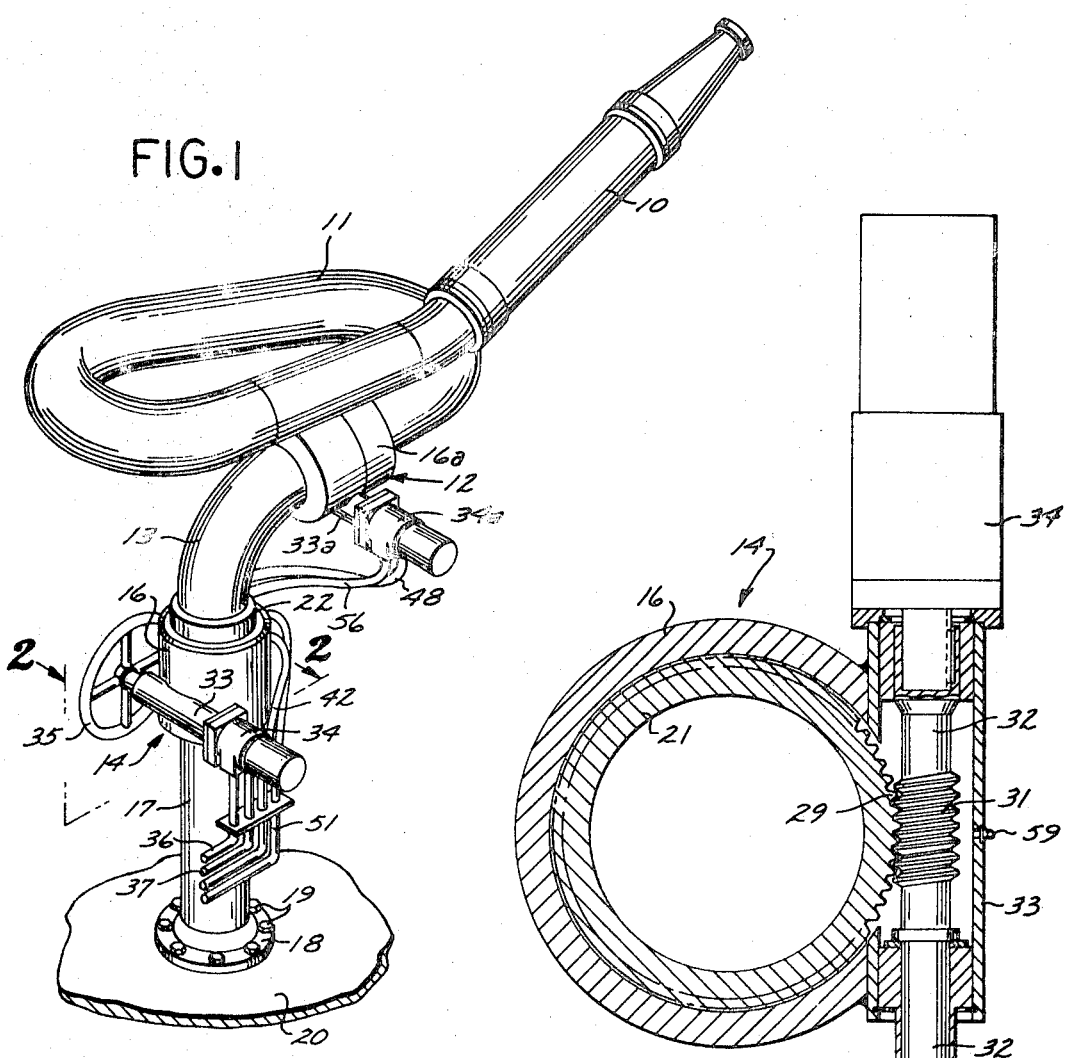
FIG. 1 is a perspective view of a hydraulic monitor incorporating first and second swivel joints constructed in accordance with the present invention.

The swivel joints are incorporated, for example, in a hydraulic monitor or giant having a nozzle portion 10 which is fixedly associated with a loop or intermediate portion 11. Loop 11 connects to a swivel joint 12 the axis of which is generally horizontal. Swivel joint 12, in turn, connects through a 90° elbow 13 to a swivel joint 14 the axis of which is generally vertical. Swivel joints 12 and 14 are power or manually operated, as described in detail below, to effect rotation of nozzle 10 about either a horizontal or a vertical axis, so that the nozzle 10 may be directed in any manner desired.

The illustrated hydraulic monitor is of the general type described and claimed in prior art Miscovich Pat. Nos. 2,612,402; 2,680,650 and 2,998,199. It is to be understood, however, that the present invention is also applicable to other types of hydraulic monitors, and to certain other types of equipment, which do not necessarily incorporate the intermediate loop 11 which is a major feature of the constructions described in the cited patents.

Figure 2:
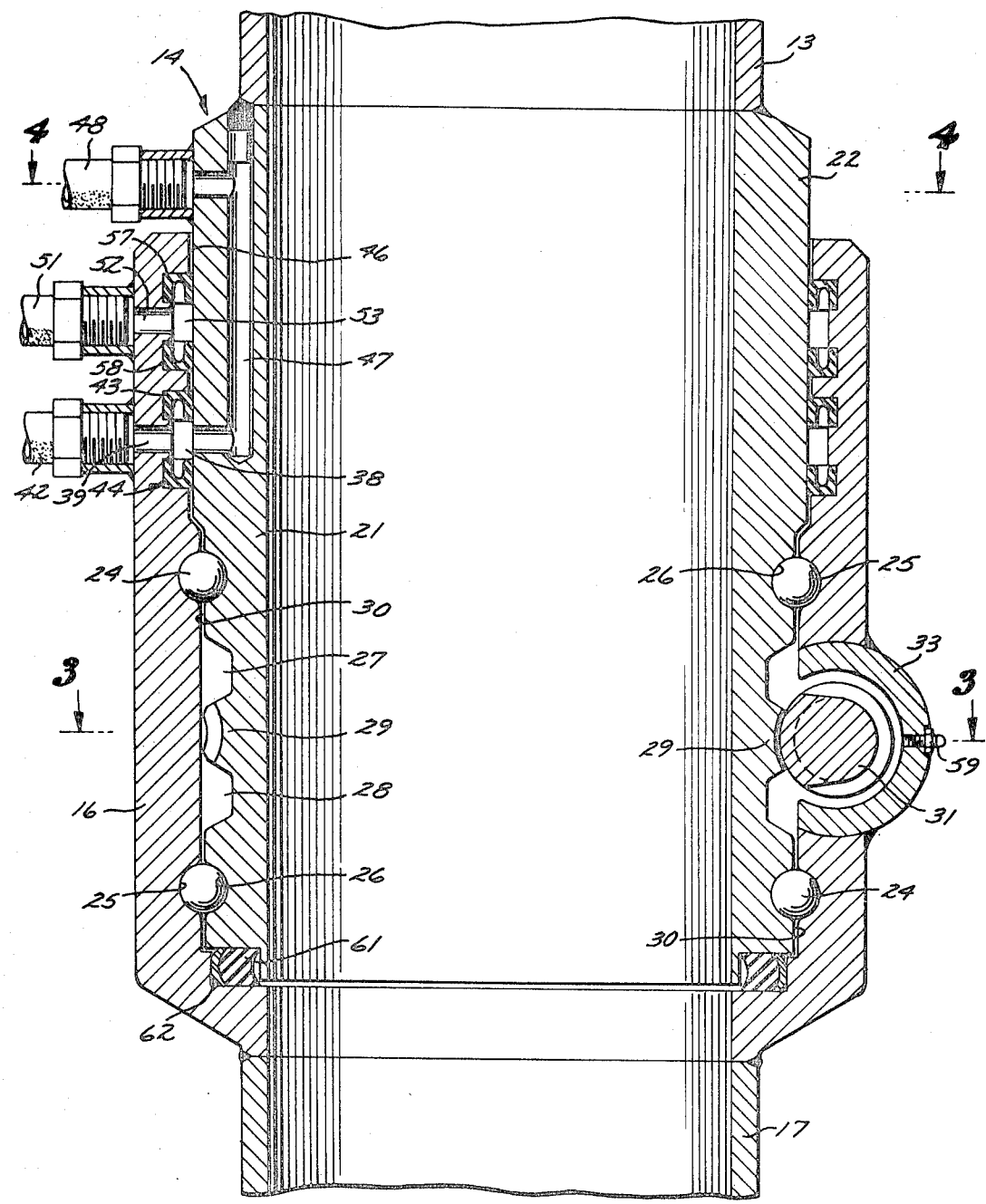
FIG. 2 is an enlarged vertical section along line 2-2 of FIG. 1.

Proceeding to a description of the swivel joint 14, this is illustrated in FIGS. 2-4 to comprise an external tubular-bearing member or housing 16 which is welded or otherwise rigidly secured to a pedestal portion 17 of the hydraulic monitor. Such pedestal 17 has a flanged base 18 (FIG. 1) which is secured by bolts 19 to a suitable floor or horizontal support 20. The member 16 forms a bearing for a tubular journal element 21 mounted coaxially therein and having an upper portion 22 which extends above the upper rim of the bearing 16.

In order to minimize friction, bearing balls 24 are provided in horizontal ball races 25 and 26 formed, respectively, in bearing 16 and in journal 21. One set of balls and cooperating races is relatively adjacent the lower end of bearing 16, whereas a second set is spaced a considerable distance upwardly therefrom but preferably substantially below the upper bearing rim. The antifriction rotation of journal 21 in bearing 16 is transmitted to the swivel joint 12, intermediate loop portion 11 and nozzle 10, since the upper end of the journal is suitably welded or otherwise rigidly and sealingly attached to elbow 13. Although the described ball bearings are preferred, other types of antifriction roller bearings may be employed if desired.

The portion of journal 21 between the upper and lower ball bearing assemblies is formed with external annular grooves 27 and 28 between which is an external worm wheel 29. The worm wheel is coaxial and preferably integral with the journal element 21, and has an outer diameter sufficiently small to prevent engagement with the interior cylindrical surface of bearing element 16. Thus, the outer portions of the worm wheel are generally flush with the exterior cylindrical surface 30 (FIG. 2) of the journal element, such cylindrical surface being radially inward from the corresponding interior cylindrical surface of bearing 16.

As shown in FIGS. 2 and 3, a worm 31 is meshed with the worm wheel 29, the worm being mounted or formed coaxially on a horizontal shaft 32 the end portions of which are suitably journaled in a worm housing 33. Housing 33 is, in turn, welded to the housing or bearing element 16 and is therefore fixed in position relative to the pedestal 17 and the underlying support 20. It follows that rotation of the worm 31 will rotate the worm wheel 29 and thus effect rotation about a vertical axis of the journal element 21 and of the upper portion of the hydraulic monitor.

One end of shaft 32 is suitably coupled (FIG. 3) to a rotary fluid motor 34, the motor being preferably hydraulic (although a pneumatic motor may also be employed). The other end of shaft 32 is connected to a handwheel 35 and/or may be connected to an electric motor, not shown. It follows that the shaft 32 and the worm 31 thereon may be rotated hydraulically, manually or electrically, it being understood that the primary manner of rotation of the shaft and the worm is preferably hydraulic. The casing of the motor 34 is rigidly secured to worm housing 33, for example by means of cooperating flange plates.

The construction of the swivel joint 12, adapted to effect rotation about a horizontal axis, is identical to the construction of the portion of joint 14 thus far described. Thus, joint 12 has an external housing or bearing member 16a on which is mounted a housing 33a and a rotary hydraulic motor 34a. Operation of motor 34a effects rotation of a worm and worm wheel to thus pivot the monitor portions 10 and 11 about a horizontal axis.

It is to be understood that the elbow 13 is fixedly connected to the housing or bearing portion 16a as by welding, whereas the internal journal element (not shown) is fixedly connected to the adjacent end of intermediate loop 11. At the opposite end of housing 33a from motor 34a is a handwheel corresponding to the one indicated at 35.

The hydraulic circuit to the motor 34 for vertical swivel joint 14 includes lines or conduits 36 and 37 connected to a suitable fluid control and associated pump or other pressure source. Thus, liquid is introduced through one of the lines and drained from the other when it is desired to rotate motor 34 in one direction, and is introduced into such other line and drained from such one line when it is desired to rotate the motor in the reverse direction.

There will next be described the means to supply liquid to the motor 34a for horizontal swivel joint 12. Referring to FIG. 2, an annular groove 38 is provided about the entire circumference of housing or bearing 16 at the interior surface thereof, such groove communicating through a port 39 with a conduit or line 42 leading to a suitable liquid source and control. First and second transfer rings 43 and 44 formed of elastomeric material are respectively provided above and below groove 38, such transfer rings being above the upper ball bearing assembly. Each transfer ring has a generally U-shaped cross section the arms of which extend toward the plane of the groove, the result being that the presence of fluid pressure in the groove increases the degree of sealing effected by the arms of the transfer rings. In order to permit a certain amount of flexing of the interior arms of the transfer rings, a radial gap or clearance 46 (FIG. 2) is provided between the interior housing surface and the exterior cylindrical surface of journal member 21.

Regardless of the rotated position of the journal element 21 in bearing element 16, the fluid conduit 42 and port 39 communicate through annular groove 38 with a passage 47 formed in journal element 21. Passage 47, in turn, communicates at the upper portion 22 of the journal element with a fluid conduit or line 48 leading to motor 34a for the horizontal swivel joint 12. Since the position of journal element 21 is fixed relative to motor 34a, there is no flexing or twisting of conduit 48 despite rotation of element 21 about the vertical axis through any number of degrees or any number of revolutions.

In like manner, a second conduit 51 leading to a fluid pressure source (and control) communicates with a port 52 and an annular groove 53, both formed in housing or bearing 16. The groove 53 communicates at all times with a passage 54 (FIG. 4) in journal element 21, and such passage communicates with a line or conduit 56 leading to the remaining port of motor 34a. First and second transfer rings 57 and 58 are provided on opposite sides of groove 53, such transfer rings corresponding to those 43 and 44 previously indicated.

When it is desired to rotate monitor sections 10 and 11 about a horizontal axis through swivel joint 12, hydraulic fluid is introduced from a suitable source into line 42, such fluid passing through port 39, groove 38, passage 47 and line 48 to one port of motor 34a. Simultaneously, hydraulic fluid drains from motor 34a through line 56, passage 54 (FIG. 4), groove 53, port 52 and line 51 to a suitable drain. To reverse the direction of rotation, the direction of fluid flow through the two lines is merely reversed by the control means.

It is a feature of the invention that the sealing means for the transfer or fluid-connector portions of the apparatus serve also to prevent leakage of lubricant liquid from the chambers containing the bearing balls 24, the worm wheel 29 and the worm 31. Referring to FIGS. 2 and 4, it is emphasized that the chamber defined within housing 33 communicates at all times with the annular grooves 27 and 28 adjacent the worm wheel. Such grooves communicate with the regions adjacent the balls 24. When lubricant fluid is introduced into the housing 33, for example through a suitable lubricant fitting indicated at 59, such fluid lubricates the worm 31 and worm wheel 29 and also the balls 24 and races therefor. Such fluid is prevented from leaking due to the presence of the ring 44 (FIG. 2) for groove 38.

At the lower end of the journal element 21, the lubricant fluid is prevented from leaking due to the presence of sealing rings indicated at 61 and 62. However, the primary function of such rings is to prevent leakage of high-pressure water from the swivel joint.

Suitable sealing means are provided in the horizontal swivel joint 16a, at the ends thereof and outwardly of the ball bearing assemblies, in order to prevent leakage of water or lubricant fluid therefrom. It is to be understood that in the event the construction is such that an additional swivel joint and associated hydraulic motor is to be provided downstream from the horizontal swivel joint 12, then such joint 12 may be constructed identically to joint 14 and may incorporate transfer rings as does the joint 14. Swivel joint 14 would then have an additional pair of grooves (and associated transfer rings) corresponding to grooves 38 and 53.

In the described manner, a simple, rugged and effective apparatus is provided to rotate various portions of the hydraulic monitor about vertical and horizontal axes, and to maintain such portions locked when no rotation is desired. There is a high mechanical advantage, permitting use of relatively small motors 34 and 34a, and permitting relatively easy manual rotation of the swivel joints through use of handwheels. Accordingly, the stream of water which emanates from nozzle 10 (after flowing through pedestal 17, joint 14, elbow 13, joint 12, and loop 11) may be readily directed in any manner desired.

The foregoing detailed description is to be clearly understood as given by way of illustration and example only, the spirit and scope of this invention being limited solely by the appended claims.

I claim:

1. A swivel joint, which comprises:
   a bearing member;
   a journal member mounted rotatably in said bearing member;
   said journal member being hollow;
   antifriction roller means mounted between said bearing member and journal member to minimize friction therebetween;
   first gear means provided fixedly and externally on said journal member circumferentially therearound and coaxially therewith;
   second gear means rotatably mounted on said bearing member and meshed with said first gear means;
   means to rotate said second gear means to thus actuate said first gear means and effect turning of said journal member in said bearing member; and
   transfer means to effect flow of fluid through said swivel joint to a second swivel joint;
   said transfer means including sealing rings having spaced-apart portions provided coaxially around said journal member;
   said transfer means further including passages in said journal member and communicating with spaces between said spaced-apart portions.

2. The invention as claimed in claim 1, in which said first gear means is a worm wheel, and said second gear means is a worm.

3. The invention as claimed in claim 2, in which said antifriction roller means comprises first and second antifriction roller assemblies provided in axially spaced relationship relative to each other, and in which said worm wheel is disposed between said roller assemblies.

4. The invention as claimed in claim 3, in which the means to mount said worm includes a worm housing provided fixedly on said bearing member, said bearing member having an opening therein permitting communication between said worm housing and the region adjacent said worm wheel, and in which seal means are provided outwardly of said roller assemblies to prevent leakage of lubricant from said worm housing and from said region adjacent said worm wheel.

5. The invention as claimed in claim 4, in which said seal means includes at least one of said sealing rings.

6. The invention as claimed in claim 2, in which the outer portions of said worm wheel are generally flush with the exterior surface of said journal member, said exterior surface being grooved on each side of said worm wheel.

7. A swivel joint, which comprises:
   a hollow external member at least a portion of which is internally generally cylindrical;

said generally cylindrical portion including a bearing section;
a hollow internal member mounted coaxially within said generally cylindrical portion of said external member and rotatable relative thereto;
said internal member including a journal section disposed adjacent said bearing section of said external member;
roller-bearing means provided between said journal section and said bearing section to minimize friction incident to rotation thereof relative to each other;
first and second pairs of sealing rings mounted externally of said internal member, and internally of said generally cylindrical portion of said external member;
each of said sealing rings being coaxial with said external and internal members and being in sealing contact with said external and internal members;
said first pair of sealing rings cooperating with said external and internal members to define a first annular space;
said second pair of sealing rings cooperating with said external and internal members to define a second annular space separated axially from said first annular space;
first passage means provided in said internal member and communicating with said first annular space;
second passage means provided in said internal member and communicating with said second annular space;
first port means provided in said external member and communicating with said first annular space; and
second port means provided in said external member and communicating with said second annular space.

8. The invention as claimed in claim 7, in which a worm wheel is fixedly provided coaxially on said internal member, in which a worm is rotatably mounted on said external member and meshed with said worm wheel, said worm extending through an opening in said external member, and in which motor means are provided to drive said worm.

9. The invention as claimed in claim 8, in which said roller-bearing means comprise first and second sets of roller bearings mounted on opposite sides of said worm wheel, and in which a worm housing is provided on said external member to prevent leakage of fluid through said opening from the vicinity of said worm.

10. The invention as claimed in claim 8, in which sealing means are provided in engagement with a radial surface at one end of said internal member, and also in engagement with a radial surface formed in said external member.

11. The invention as claimed in claim 8, in which means are provided to maintain fluid in the vicinity of said worm, and in which said sealing rings are disposed to aid in preventing leakage of such fluid from the vicinity of said worm.